No. 874,246. PATENTED DEC. 17, 1907.
W. M. ROSE.
OIL COLUMN.
APPLICATION FILED JUNE 25, 1906.
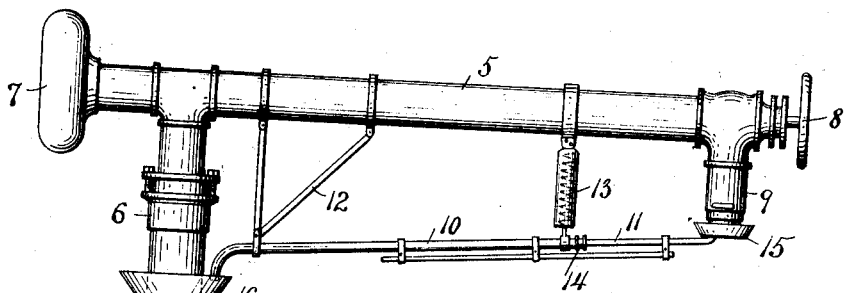
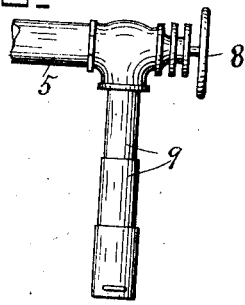
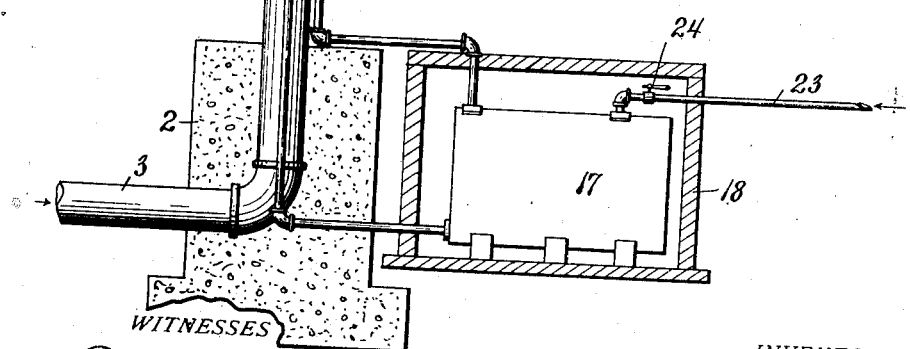

UNITED STATES PATENT OFFICE.

WESLEY M. ROSE, OF SACRAMENTO, CALIFORNIA.

OIL-COLUMN.

No. 874,246.

Specification of Letters Patent.

Patented Dec. 17, 1907.

Application filed June 25, 1906. Serial No. 323,249.

*To all whom it may concern:*

Be it known that WESLEY M. ROSE, a citizen of the United States, residing at Sacramento, in the county of Sacramento and State of California, has invented certain new and useful Improvements in Oil-Columns, of which the following is a specification.

My invention relates generally to stand pipes but is more particularly designed as an oil column for delivering fuel or other oil to locomotives, cars, wagons, and other vehicles and tanks from storage tanks and consists of the parts and combination of parts as will be more fully hereinafter pointed out.

Heretofore, it has been customary to use vertically moving spouts or columns without means for catching the waste oil and consequently said oil becomes spattered upon surrounding objects and is thus constantly a source of danger from fire and expense in cleaning.

The object of my invention is to overcome these difficulties and to provide means for the collection of all waste and leakage of oil and the return of the same to the storage tank or pipe lines.

In the drawing, Figure 1 is a side elevation of a stand pipe embodying my invention. Fig. 2 is a detail view of the telescoping nozzle. Fig. 3 is a detail view of the sump with connected parts broken away.

1 indicates the vertical member of the stand pipe embedded for a support in the concrete block or other suitable foundation 2, the lower end of said member being connected to the pipe line 3.

4 is a valve in the vertical member for controlling the flow of oil or other fluid through the stand pipe.

5 is a horizontal member of the stand pipe revolubly mounted in a packing box 6 upon the vertical member 1; said horizontal member 5 having a counter-balance weight 7. The outer end of the horizontal member 5 is provided with a control valve 8, from which extends a nozzle 9 composed of a series of telescoping sections as more clearly shown in Fig. 2.

A waste pipe composed of telescopic sections 10 and 11 is suspended from the horizontal member 5 by means of a rigid bracket 12 and a spring support 13, the spring support 13 being secured to the member 10 of the waste pipe.

14 is a packing box between the sections 10 and 11 of the waste pipe to prevent leakage at the joint between the two sections of pipe. The outer end of the pipe section 11 carries a dripping pan 15 which is adapted, under the influence of the spring support 13 to have a fluid tight engagement with the lower end of the nozzle 9 whereby all drippings and waste from the nozzle are prevented from falling to the ground and becoming lost, said waste being conducted from said pan through the waste pipe sections 10 and 11, whence it is delivered into the sump 16. The sump 16 is secured to the vertical member 1 of the stand pipe and extends entirely around the pipe with a fluid tight joint and is positioned on said member 1 below the stuffing box 6 so that all drippings from the stuffing box are caught therein. It will be noticed that the discharge end of the waste pipe is deflected downwardly toward the sump 16 and projects slightly into said sump but is not rigidly attached to the sump, the object of which will be more fully hereinafter set out.

17 is a waste tank suitably mounted in an underground vault 18. This tank is connected to the sump 16 by means of a pipe 19, having a valve 20. The waste tank 17 is connected to the vertical member 1 by means of a pipe 21 having a suitable valve 22. The pipe 21 leads from the bottom of the waste tank while the pipe 19 leads to the top of the tank.

23 is a pipe leading into the top of the waste tank 17 from a suitable source of pressure, such for instance, as a steam boiler or compressed air tank.

The operation of the stand pipe is as follows: The revoluble member 5 of the stand pipe is swung into the desired position, thus bringing the nozzle 9 directly over the vehicle to be filled with oil whereupon the drip pan 15 is removed from the end of the nozzle by depressing the waste pipe against the tension of the spring support 13 and swinging said pan to one side of the nozzle, the spring support elevating the pan above the lower end of the nozzle. If necessary, the nozzle is lengthened by extending its telescopic sections. Assuming that the valve 8 is open, the valve 4 is now opened and oil or other liquid fuel permitted to flow through the stand pipe through the vertical member 1, the horizontal member 5, thence through the nozzle 9 into the receptacle to be filled. As soon as the vehicle is filled, the valve 4 is closed and the drip pan 15 immediately swung under and up against the lower end of the nozzle 9, where it is held with a liquid tight joint by means of the spring support 13. The oil remaining in the horizontal member 5 and nozzle 9 is conducted through the waste pipe sections 10 and 11 into the sump 16, whence it is conducted into the waste tank 17 by means of the pipe 19. The waste tank 17 may be of a capacity that will hold the waste of the stand pipe, for, say, twenty-four hours. Of course it may be larger or smaller as desired. As soon as the tank 17 is filled, the valve 20 in the pipe 19 is closed, the valve 22 in the pipe 21 opened, and the valve 24 in the pipe 23 opened, whereupon, pressure is introduced into the waste tank 17 of sufficient degree to expel all of the contents from the said tank through the pipe 21 into the vertical member of the stand pipe whereby all waste from the stand pipe is returned to the stand pipe or into the pipe line.

The waste pipe from the nozzle 9 being free from the sump 16, is free to be revolved with the horizontal member 5, whereby its delivery end is always in proper position to deliver the waste within the sump.

Inasmuch as there is a sliding connection between the sections 10 and 11 of the waste pipe, the drip pan when removed from the end of the nozzle 9, may, with the pipe section 11, be moved toward the vertical member 1 of the stand pipe, the section 11 telescoping within the section 10.

As soon as the waste tank 17 has been emptied of its contents, the valves 24 and 22 are closed and the valve 20 opened.

It is obvious that slight changes might be made in the details of construction without departing from the spirit of my invention, hence, I do not confine myself to the details of construction shown.

What I claim as new and desire to secure by Letters Patent is:

1. The combination with a fluid stand pipe, of a waste receptacle, means connecting said receptacle with the delivery end of said pipe, and means connecting said receptacle with said stand pipe below the delivery end.

2. The combination with a fluid stand pipe, of a waste receptacle, means connecting said receptacle with the delivery end of said pipe, means connecting the receptacle with said stand pipe below the delivery end and means to discharge the waste from said receptacle into the supply pipe.

3. The combination with a fluid stand pipe, of means to collect the drippings from the delivery end of the pipe and means to discharge said drippings into the supply pipe of the stand pipe, whereby the waste of the fluid is prevented.

4. In a stand pipe, the combination with the delivery pipe, of a drip pan and pipe leading therefrom, and resiliently mounted on said delivery pipe.

5. In a stand pipe, the combination with a vertical pipe, a sump secured around the same, of a horizontal delivery pipe revolubly mounted on said vertical pipe, a drip pan adapted to close the end of the delivery pipe, a pipe connected to said pan and leading in said sump but free to move around the vertical pipe within said sump.

6. In a stand pipe, the combination with a vertical pipe, of a sump secured around the same, of a horizontal delivery pipe revolubly mounted on said vertical pipe, a drip pan adapted to close the end of the delivery pipe, a pipe connected to said pan and leading into said sump but free to move around the vertical pipe within said sump and a waste receptacle connected with said sump.

7. In a stand pipe, the combination with a horizontally disposed delivery pipe revolubly mounted, of a waste receptacle, a drip pipe leading from the end of the delivery pipe into said receptacle, a valve in said pipe, a supply pipe, a valved pipe leading from said receptacle into the supply pipe, a valve in the supply pipe above the valved pipe, and a pressure supply pipe leading into the waste tank whereby the waste may be delivered from the said receptacle into the supply pipe.

8. In a stand pipe, the combination with the delivery portion, of a drip pan adapted to seal said portion, a pipe secured to and communicating with said pan, a bracket carrying the inner end of said pipe, a spring secured to the said delivery portion and resiliently supporting the outer portion of said pipe and its pan.

9. In a stand pipe, the combination with the delivery portion, of a drip pan adapted to seal said portion, a pipe secured to and communicating with said pan, a bracket carrying the inner end of said pipe, a spring secured to the said delivery portion and resiliently supporting the outer portion of said pipe and its pan, and a sump pan secured immediately below the inner end of the pipe leading from the drip pan.

In testimony whereof I affix my signature in presence of two witnesses.

WESLEY M. ROSE.

Witnesses:
FRANK D. RYAN,
JAMES B. DEVINE.